(12) United States Patent
Matsuda

(10) Patent No.: US 9,749,944 B2
(45) Date of Patent: Aug. 29, 2017

(54) COMMUNICATION DEVICE, COMMUNICATION TERMINAL, AND COMMUNICATION METHOD

(71) Applicant: Funai Electric Co., Ltd., Daito-shi, Osaka (JP)

(72) Inventor: Masahiro Matsuda, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 150 days.

(21) Appl. No.: 14/689,482

(22) Filed: Apr. 17, 2015

(65) Prior Publication Data

US 2015/0304945 A1  Oct. 22, 2015

(30) Foreign Application Priority Data

Apr. 18, 2014  (JP) .................................. 2014-086549

(51) Int. Cl.
| | | |
|---|---|---|
| *H04W 48/18* | (2009.01) | |
| *H04W 24/02* | (2009.01) | |
| *H04L 29/08* | (2006.01) | |

(52) U.S. Cl.
CPC ............. *H04W 48/18* (2013.01); *H04L 67/14* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 8,208,899 | B2 | 6/2012 | Suzuki | |
| 2003/0060157 | A1* | 3/2003 | Henrick | G06Q 30/06 455/3.04 |
| 2005/0233744 | A1* | 10/2005 | Karaoguz | H04W 12/08 455/432.3 |
| 2012/0066767 | A1* | 3/2012 | Vimpari | H04L 9/0866 726/26 |
| 2013/0254850 | A1* | 9/2013 | Alison | H04W 4/206 726/4 |
| 2014/0053281 | A1* | 2/2014 | Benoit | H04L 12/2809 726/29 |

(Continued)

FOREIGN PATENT DOCUMENTS

| | | |
|---|---|---|
| JP | 2007-181040 A | 7/2007 |
| JP | 2008-99245 A | 4/2008 |
| JP | 2010-136100 A | 6/2010 |

*Primary Examiner* — Charles C Jiang
*Assistant Examiner* — Rose Clark
(74) *Attorney, Agent, or Firm* — Crowell & Moring LLP

(57) ABSTRACT

A communication device includes a communication portion and a controller that determines whether or not a communication terminal from which the communication portion has received a connection request is a specified communication terminal. The controller makes a connection with the specified communication terminal based on the determination result of whether or not the communication terminal from which the communication portion has received the connection request is the specified communication terminal and transmits connection permission/refusal setting information to the specified communication terminal with which the controller has made a connection to allow a user to provide a connection permission/refusal setting of a communication terminal other than the specified communication terminal.

20 Claims, 11 Drawing Sheets

SCREEN OF CONNECTION PERMISSION/REFUSAL SETTINGS
AND SERVICE SELECTION SETTINGS
(DISPLAY SCREEN OF WIRELESS COMMUNICATION TERMINAL 20)

CONNECTION — WIRELESS COMMUNICATION
SETTINGS       TERMINAL 30

PERMIT/REFUSE ● PERMIT  ○ REFUSE
CONNECTION

SELECT SERVICE
PLEASE SELECT SERVICE(S) PROVIDED TO WIRELESS COMMUNICATION TERMINAL 30.

☐ SERVICE 1
☑ SERVICE 2
☑ SERVICE 3
☐ SERVICE 4
☑ SERVICE 5

[CHANGE SETTING] [CANCEL]

(56) References Cited

U.S. PATENT DOCUMENTS

| | | | |
|---|---|---|---|
| 2014/0130138 A1* | 5/2014 | Ma | H04L 63/08 726/4 |
| 2014/0157392 A1* | 6/2014 | Smith | H04L 63/08 726/9 |
| 2014/0223516 A1* | 8/2014 | Vongsouvanh | H04L 63/0492 726/4 |
| 2014/0351434 A1* | 11/2014 | Kim | H04L 63/0227 709/225 |
| 2014/0351910 A1* | 11/2014 | Tenenboym | H04L 63/0823 726/7 |
| 2015/0118991 A1* | 4/2015 | Chung | G06Q 20/123 455/406 |
| 2015/0180870 A1* | 6/2015 | Zhang | H04L 63/10 726/4 |
| 2015/0193465 A1* | 7/2015 | Schoeffler | G06F 17/30194 707/827 |
| 2015/0304301 A1* | 10/2015 | Ren | H04L 63/08 726/7 |

* cited by examiner

FIRST EMBODIMENT

FIG.3

CONNECTION SETTING SCREEN
(DISPLAY SCREEN OF WIRELESS COMMUNICATION TERMINAL 20)

CONNECTION SETTINGS

| DEVICE NAME | CURRENT SETTINGS |
|---|---|
| WIRELESS COMMUNICATION TERMINAL 20 | PERMITTED TO CONNECT |
| WIRELESS COMMUNICATION TERMINAL 30 | REFUSED TO CONNECT |
| WIRELESS COMMUNICATION TERMINAL 40 | REFUSED TO CONNECT |

[SAVE SETTINGS] [CANCEL]

FIG.4

SCREEN OF CONNECTION PERMISSION/REFUSAL SETTINGS
AND SERVICE SELECTION SETTINGS
(DISPLAY SCREEN OF WIRELESS COMMUNICATION TERMINAL 20)

CONNECTION SETTINGS – WIRELESS COMMUNICATION TERMINAL 30

PERMIT/REFUSE CONNECTION  ● PERMIT  ○ REFUSE

SELECT SERVICE
PLEASE SELECT SERVICE(S) PROVIDED TO WIRELESS COMMUNICATION TERMINAL 30.

- ☐ SERVICE 1
- ☑ SERVICE 2
- ☑ SERVICE 3
- ☐ SERVICE 4
- ☑ SERVICE 5

[CHANGE SETTING] [CANCEL]

FIG.5  SERVICE SELECTION SCREEN
(DISPLAY SCREEN OF WIRELESS COMMUNICATION TERMINAL 30)
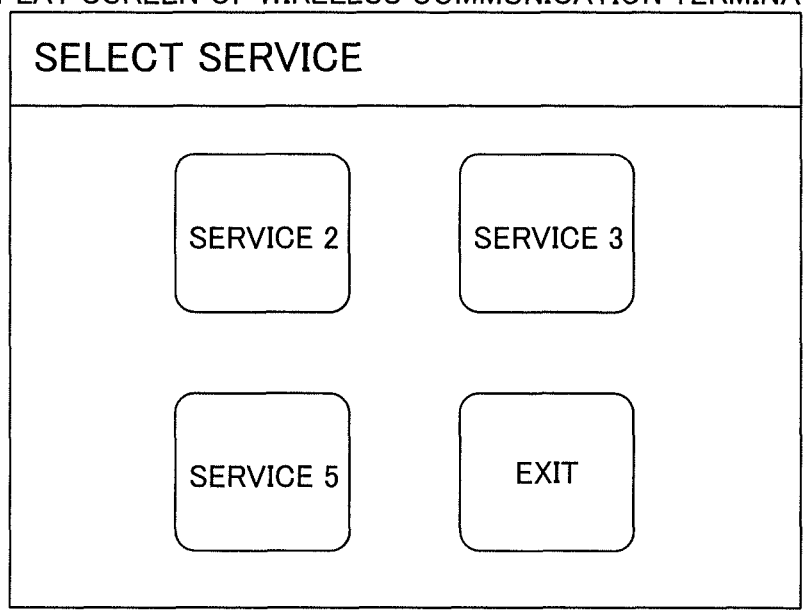

FIG.6 CONNECTION SETTING PROCESSING FLOW (FIRST EMBODIMENT)
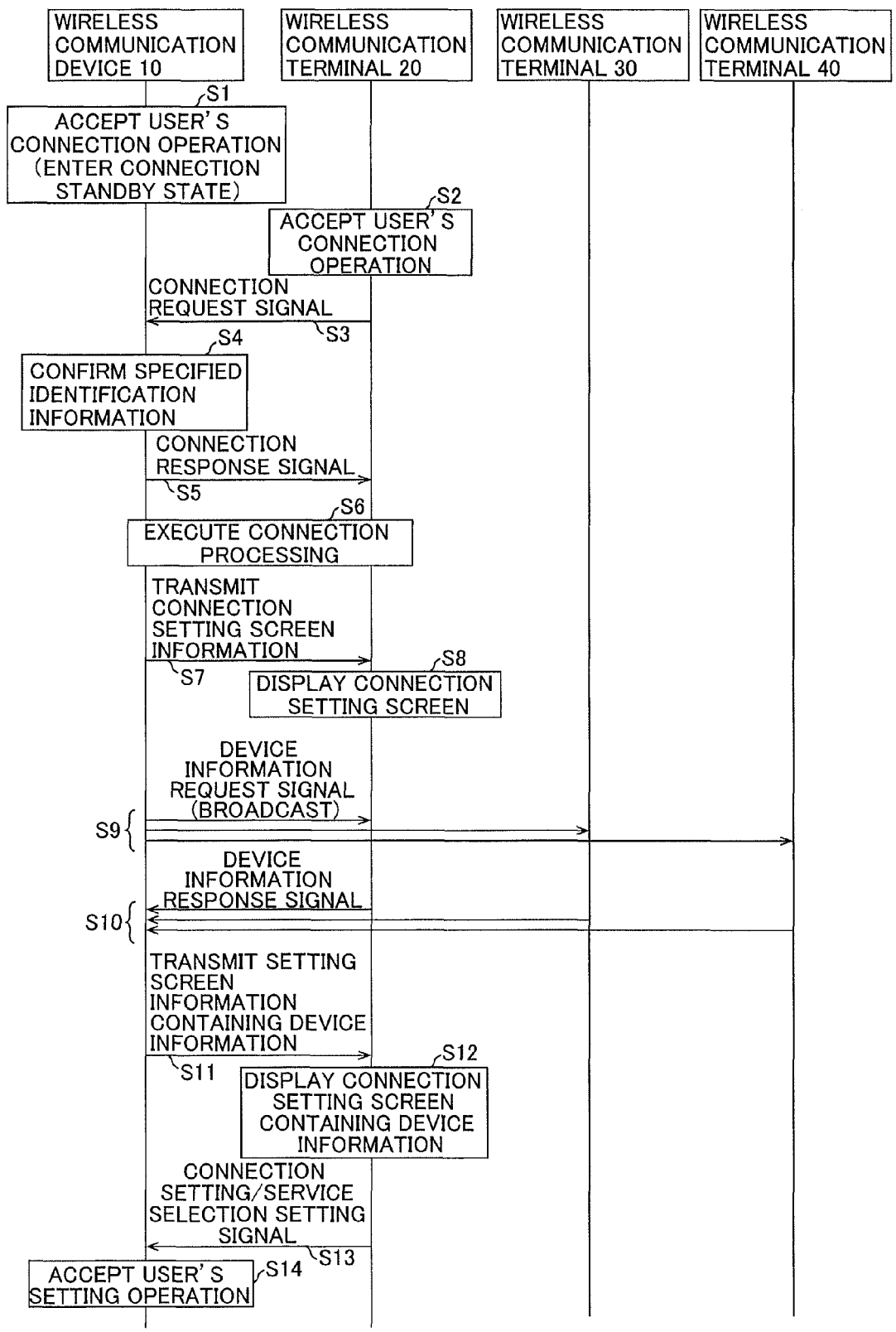

FIG. 7  SERVICE PROVISION PROCESSING FLOW (FIRST EMBODIMENT)
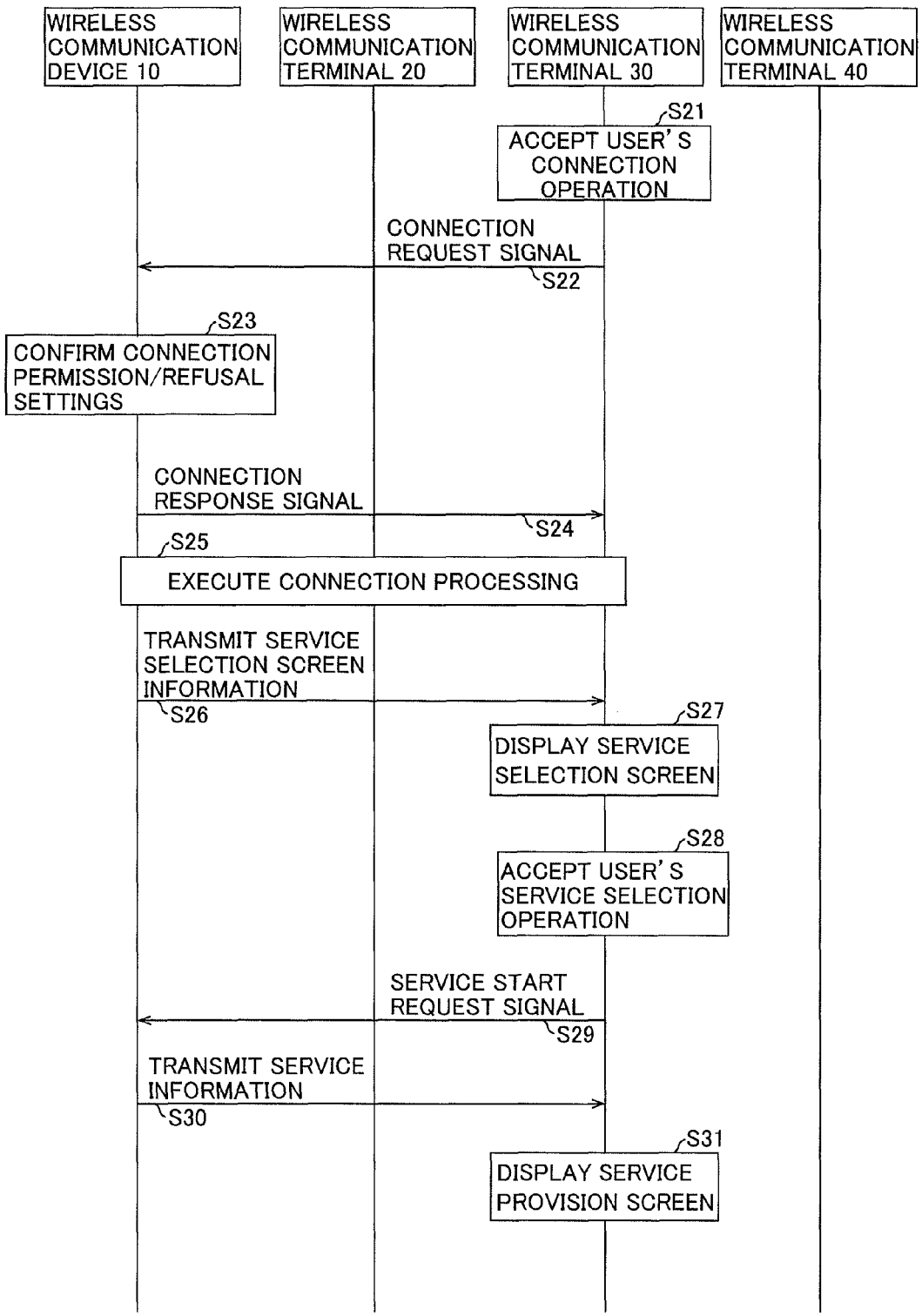

SECOND EMBODIMENT
SERVICE SELECTION SCREEN IN CASE
WHERE SERVICE 2 IS UNAVAILABLE
(DISPLAY SCREEN OF WIRELESS COMMUNICATION TERMINAL 30)

SERVICE SCREEN IN CASE WHERE SERVICE IS DIRECTLY PROVIDED
(DISPLAY SCREEN OF WIRELESS COMMUNICATION TERMINAL 30)

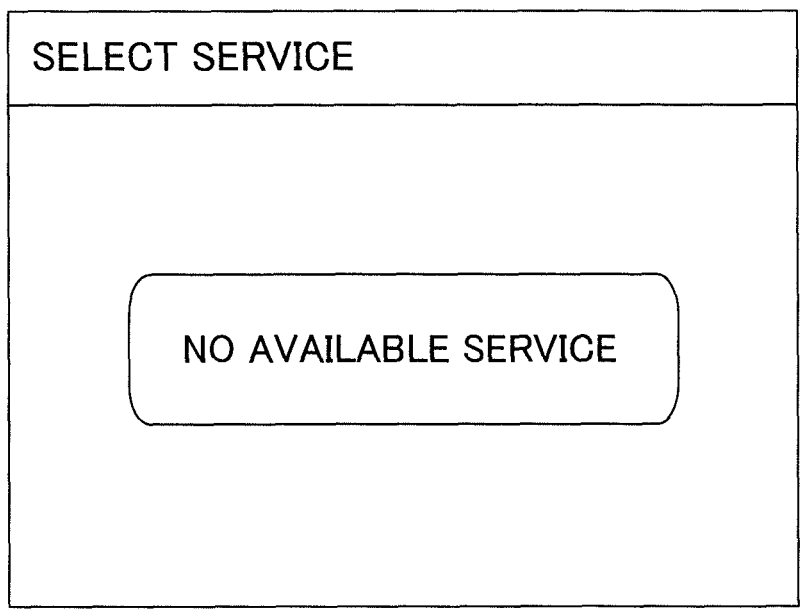
FIG.10 NOTIFICATION SCREEN
(DISPLAY SCREEN OF WIRELESS COMMUNICATION TERMINAL 30)

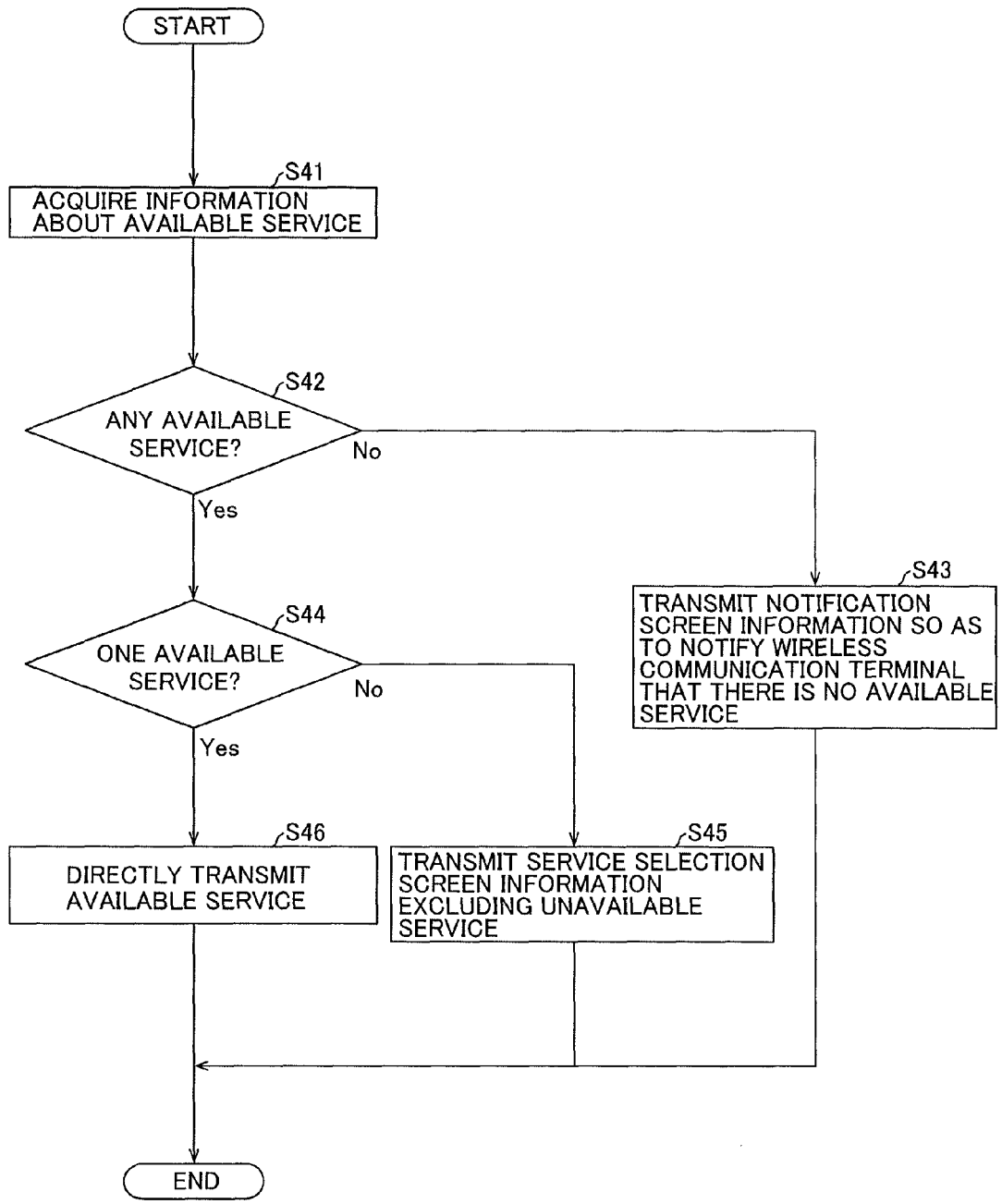

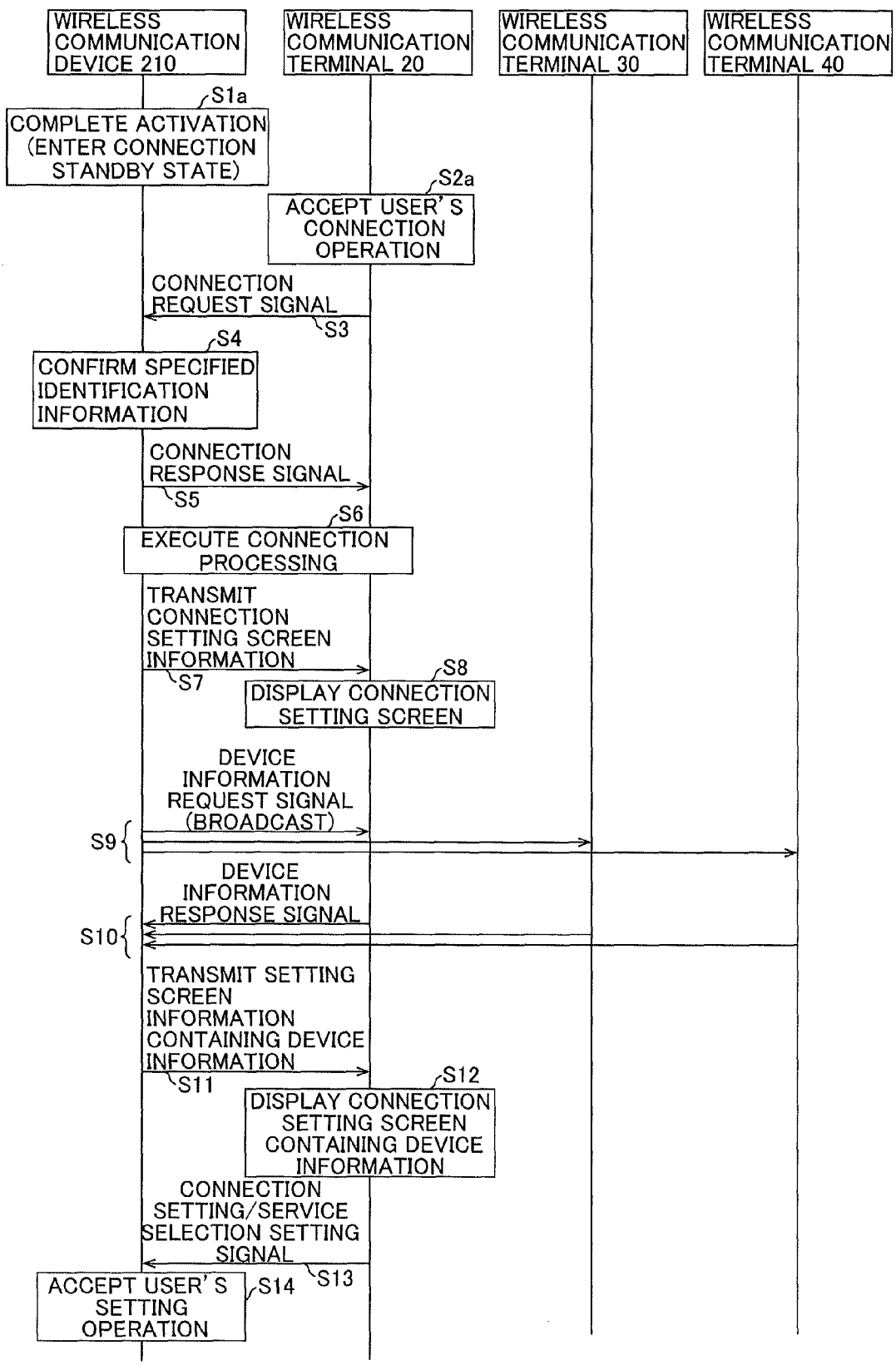
FIG.12  CONNECTION SETTING PROCESSING FLOW (THIRD EMBODIMENT)

FIG. 13  CONNECTION SETTING PROCESSING FLOW (FOURTH EMBODIMENT)
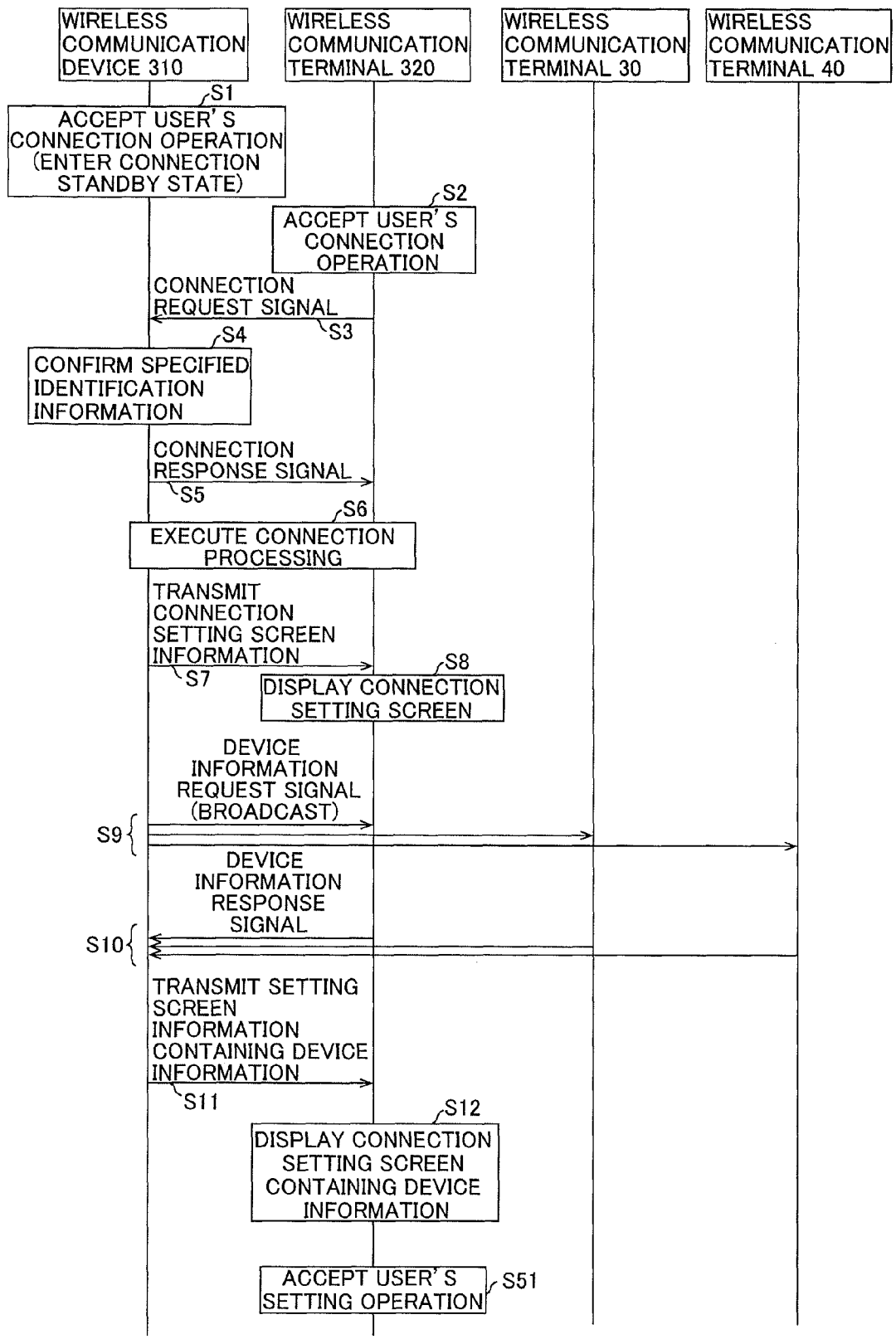

FIG.14 SERVICE PROVISION PROCESSING FLOW (FOURTH EMBODIMENT)
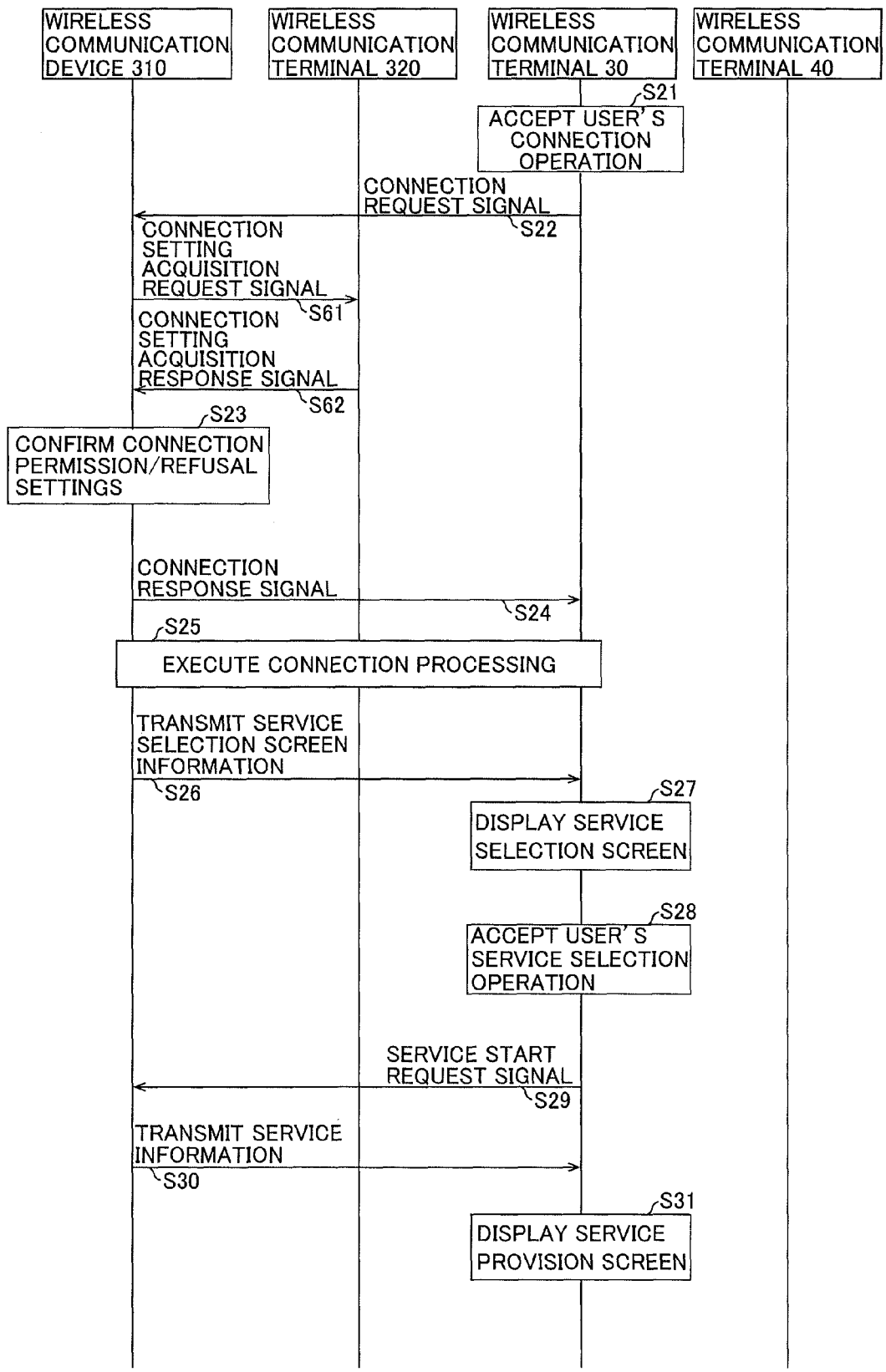

COMMUNICATION DEVICE, COMMUNICATION TERMINAL, AND COMMUNICATION METHOD

CROSS-REFERENCE TO RELATED APPLICATION

The priority application number JP2014-086549, Wireless Communication Device and Wireless Communication System, Apr. 18, 2014, Masahiro Matsuda, upon which this patent application is based is hereby incorporated by reference.

BACKGROUND OF THE INVENTION

Field of the Invention

The present invention relates to a communication device, a communication terminal, and a communication method, and more particularly, it relates to a communication device that communicates with an in-network communication terminal, this communication terminal, and a communication method for the same.

Description of the Background Art

A communication device that communicates with an in-network communication terminal is known in general, as disclosed in Japanese Patent Laying-Open No. 2010-136100, for example.

Japanese Patent Laying-Open No. 2010-136100 discloses a communication terminal (communication terminal) that has a wireless LAN function and an access point (communication device) that communicates with the communication terminal to form a network as an example of networking. The access point described in Japanese Patent Laying-Open No. 2010-136100 makes a connection with the communication terminal by a method that corresponds to the WPS (registered trademark) (Wi-Fi Protected Setup) standards. In other words, a WPS-enabled button of the communication terminal is pushed, and thereafter a WPS-enabled button of the access point is pushed within a prescribed time, whereby the access point described in Japanese Patent Laying-Open No. 2010-136100 makes a connection with the communication terminal.

According to Japanese Patent Laying-Open No. 2010-136100, however, devices prior to connection are indistinguishable from each other in the case where a WPS-enabled button of a communication device different from the access point intended to be connected to the communication terminal by a user is pushed within a prescribed time after the WPS-enabled button of the communication terminal is pushed, and hence the communication device different from the communication device (access point) intended to be connected to the communication terminal by the user may be disadvantageously connected to the communication terminal. Reversely to the procedure described in Japanese Patent Laying-Open No. 2010-136100, in the case where the button of the communication terminal is pushed after the button of the access point is pushed in order to make a connection between the access point and the communication terminal, a communication terminal different from the communication terminal intended to be connected by the user may be advantageously connected to the communication device, similarly to Japanese Patent Laying-Open No. 2010-136100.

SUMMARY OF THE INVENTION

The present invention has been proposed in order to solve the aforementioned problem, and an object of the present invention is to provide a communication device that can significantly reduce or prevent connection with a communication terminal not intended by a user, a communication terminal, and a communication method.

In order to attain the aforementioned object, a communication device according to a first aspect of the present invention includes a communication portion and a controller that determines whether or not a communication terminal from which the communication portion has received a connection request is a specified communication terminal, and the controller makes a connection with the specified communication terminal based on the determination result of whether or not the communication terminal from which the communication portion has received the connection request is the specified communication terminal and transmits connection permission/refusal setting information to the specified communication terminal with which the controller has made a connection to allow a user to provide a connection permission/refusal setting of a communication terminal other than the specified communication terminal. The "connection" according to the present invention denotes a state where the communication device can communicate with the communication terminal to provide a prescribed service together with the connection permission/refusal setting to the communication terminal.

In the communication device according to the first aspect of the present invention, as hereinabove described, the controller makes a connection with the specified communication terminal based on the determination result of whether or not the communication terminal from which the communication portion has received the connection request is the specified communication terminal. Thus, the communication device can make a connection with only the specified communication terminal before the user provides the connection permission/refusal setting. Furthermore, the controller transmits the connection permission/refusal setting information to the specified communication terminal with which the communication device has made a connection to allow the user to provide the connection permission/refusal setting of the communication terminal other than the specified communication terminal. Thus, the user can provide the connection permission/refusal setting between the communication terminal other than the specified communication terminal and the communication device through the specified communication terminal with which the communication device has made a connection. Consequently, the communication device can make a connection with only the specified communication terminal and the communication terminal permitted to connect by the user after the user provides the connection permission/refusal setting, and hence connection of the communication device with the communication terminal not intended by the user can be significantly reduced or prevented.

The aforementioned communication device according to the first aspect is preferably capable of providing a prescribed service, and the controller preferably further transmits selection setting information to the specified communication terminal to allow the user to provide a selection setting of the prescribed service to be provided. According to this structure, the user can easily select the prescribed service to be provided to the communication terminal to which the prescribed service is provided through the specified communication terminal with which the communication device has made a connection.

In the aforementioned communication device capable of providing the prescribed service, the prescribed service preferably includes a playback service for video content or music content. According to this structure, the video content or the music content can be provided to the communication terminal to which the prescribed service is provided as the prescribed service.

In the aforementioned communication device capable of providing the prescribed service, the prescribed service preferably includes a file transfer service or a communication service. According to this structure, the file transfer service or the communication service can be provided to the communication terminal to which the prescribed service is provided as the prescribed service.

In the aforementioned communication device capable of providing the prescribed service, the controller preferably transmits the prescribed service selectively set based on the selection setting information to a communication terminal to which the prescribed service is provided. According to this structure, only the prescribed service intended to be provided by the user (selected by the user) can be provided to the communication terminal to which the prescribed service is provided, and hence provision of a service not intended by the user to the communication terminal to which the prescribed service is provided can be prevented.

In this case, the controller preferably does not transmit a service unavailable on the communication terminal to which the prescribed service is provided to the communication terminal to which the prescribed service is provided when the prescribed service selectively set based on the selection setting information is the service unavailable on the communication terminal to which the prescribed service is provided. According to this structure, the communication device does not provide an unnecessary prescribed service unavailable on the communication terminal to which the prescribed service is provided, and hence an increase in the volume of communication can be significantly reduced or prevented. When the user uses the prescribed service on the communication terminal to which the prescribed service is provided, the communication device does not provide the prescribed service unavailable on the communication terminal to which the prescribed service is provided, and hence the user's erroneous selection of the prescribed service unavailable on the communication terminal to which the prescribed service is provided can be prevented. Thus, the convenience can be improved when the user selects the prescribed service.

In the aforementioned communication device capable of providing the prescribed service, the controller preferably transmits selection information to a communication terminal to which the prescribed service is provided to allow the user to select a service to be used from the prescribed service selectively set based on the selection setting information. According to this structure, the user can easily select the prescribed service to be used from the prescribed service selectively set based on the selection setting information through the communication terminal to which the prescribed service is provided.

In this case, the controller preferably does not transmit the selection information to the communication terminal to which the prescribed service is provided when there is one service available on the communication terminal to which the prescribed service is provided in the prescribed service selectively set based on the selection setting information. According to this structure, an increase in the volume of communication can be significantly reduced or prevented by not transmitting the selection information when it is not necessary to transmit the selection information.

In the aforementioned communication device capable of providing the prescribed service, the controller preferably notifies a communication terminal to which the prescribed service is provided that there is not the prescribed service available on the communication terminal to which the prescribed service is provided when there is no service available on the communication terminal to which the prescribed service is provided in the prescribed service selectively set based on the selection setting information. According to this structure, the user can easily know that there is no service available on the communication terminal to which the prescribed service is provided in the prescribed service selectively set based on the selection setting information.

In the aforementioned communication device according to the first aspect, the controller preferably acquires information about the connection permission/refusal setting set based on the connection permission/refusal setting information and determines whether or not the communication terminal other than the specified communication terminal is a communication terminal permitted to connect based on the information about the connection permission/refusal setting that has been acquired. According to this structure, the communication device can reliably make a connection with the communication terminal permitted to connect.

In this case, the communication device preferably further includes a storage portion that stores the information about the connection permission/refusal setting. According to this structure, the communication device can manage the information about the connection permission/refusal setting set based on the connection permission/refusal setting information. Consequently, the communication device can promptly determine whether or not the connection request from the communication terminal other than the specified communication terminal is a connection request from the communication terminal permitted to connect, as compared with the case where the communication terminal engages the information about the connection permission/refusal setting.

A communication terminal according to a second aspect of the present invention includes a communication portion that communicates with a communication device and a controller that transmits a connection request containing specified identification information to the communication device through the communication portion and makes a connection with the communication device, and the controller acquires connection permission/refusal setting information from the communication device with which the controller has made a connection to allow a user to provide a connection permission/refusal setting between the communication device and another communication terminal.

In the communication terminal according to the second aspect of the present invention, as hereinabove described, the controller acquires the connection permission/refusal setting information from the communication device with which the controller has made a connection to allow the user to provide the connection permission/refusal setting between the communication device and another communication terminal. Thus, connection of the communication device with the communication terminal not intended by the user can be significantly reduced or prevented, similarly to the case of the communication device according to the aforementioned first aspect.

The aforementioned communication terminal according to the second aspect preferably further includes a display portion, and the controller preferably displays a setting screen of the connection permission/refusal setting between the communication device and another communication terminal on the display portion based on the connection permission/refusal setting information that has been acquired.

According to this structure, the user can easily provide the connection permission/refusal setting between the communication device and another communication terminal through the setting screen of the connection permission/refusal setting displayed on the display portion.

In this case, the controller preferably acquires selection setting information from the communication device to allow the user to provide a selection setting of a prescribed service and displays a setting screen of the selection setting of the prescribed service on the display portion based on the selection setting information that has been acquired. According to this structure, the user can easily provide the selection setting of the prescribed service through the setting screen of the selection setting displayed on the display portion.

The aforementioned communication terminal according to the second aspect preferably further includes a storage portion that stores information about the connection permission/refusal setting set based on the connection permission/refusal setting information. According to this structure, the communication terminal can manage the information about the connection permission/refusal setting set based on the connection permission/refusal setting information. Consequently, the memory capacity of the communication device can be conserved as compared with the case where the communication device manages the information about the connection permission/refusal setting.

A communication method according to a third aspect of the present invention includes steps of determining whether or not a communication terminal from which a communication portion of a communication device has received a connection request is a specified communication terminal by a controller of the communication device, and making a connection between the controller of the communication device and the specified communication terminal based on the determination result of whether or not the communication terminal from which the communication portion of the communication device has received the connection request is the specified communication terminal and transmitting connection permission/refusal setting information to the specified communication terminal with which the controller of the communication device has made a connection by the controller of the communication device to allow a user to provide a connection permission/refusal setting of a communication terminal other than the specified communication terminal.

As hereinabove described, the communication method according to the third aspect of the present invention includes the step of making a connection between the controller of the communication device and the specified communication terminal based on the determination result of whether or not the communication terminal from which the communication portion of the communication device has received the connection request is the specified communication terminal and transmitting connection permission/refusal setting information to the specified communication terminal with which the controller of the communication device has made a connection by the controller of the communication device to allow the user to provide the connection permission/refusal setting of the communication terminal other than the specified communication terminal. Thus, connection of the communication device with the communication terminal not intended by the user can be significantly reduced or prevented, similarly to the case of the communication device according to the aforementioned first aspect.

The aforementioned communication method according to the third aspect preferably further includes a step of transmitting selection setting information to the specified communication terminal by the controller of the communication device to allow the user to provide a selection setting of a prescribed service to be provided by the communication device. According to this structure, the user can easily select the prescribed service to be provided to the communication terminal to which the prescribed service is provided through the specified communication terminal with which the communication device has made a connection.

In this case, the communication method preferably further includes a step of transmitting the prescribed service selectively set based on the selection setting information to a communication terminal to which the prescribed service is provided by the controller of the communication device. According to this structure, only the prescribed service intended to be provided by the user (selected by the user) can be provided to the communication terminal to which the prescribed service is provided, and hence provision of a service not intended by the user to the communication terminal to which the prescribed service is provided can be prevented.

In the aforementioned structure further including the step of transmitting the prescribed service selectively set based on the selection setting information, the step of transmitting the prescribed service preferably includes a step of not transmitting a service unavailable on the communication terminal to which the prescribed service is provided to the communication terminal to which the prescribed service is provided by the controller of the communication device when the prescribed service selectively set based on the selection setting information is the service unavailable on the communication terminal to which the prescribed service is provided. According to this structure, the communication device does not provide an unnecessary prescribed service unavailable on the communication terminal to which the prescribed service is provided, and hence an increase in the volume of communication can be significantly reduced or prevented. When the user uses the prescribed service on the communication terminal to which the prescribed service is provided, the communication device does not provide the prescribed service unavailable on the communication terminal to which the prescribed service is provided, and hence the user's erroneous selection of the prescribed service unavailable on the communication terminal to which the prescribed service is provided can be prevented. Thus, the convenience can be improved when the user selects the prescribed service.

The aforementioned structure further including the step of transmitting the selection setting information preferably further includes a step of transmitting selection information to a communication terminal to which the prescribed service is provided by the controller of the communication device to allow the user to select a service to be used from the prescribed service selectively set based on the selection setting information. According to this structure, the user can easily select the prescribed service to be used from the prescribed service selectively set based on the selection setting information through the communication terminal to which the prescribed service is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates a connection setting screen displayed on the wireless communication terminal of the wireless communication system according to the first embodiment of the present invention;

FIG. 4 illustrates a screen of connection permission/refusal settings and service selection settings displayed on the wireless communication terminal of the wireless communication system according to the first embodiment of the present invention;

FIG. 5 illustrates a service selection screen displayed on another wireless communication terminal of the wireless communication system according to the first embodiment of the present invention;

FIG. 6 is a sequence diagram for illustrating connection setting processing in the wireless communication system according to the first embodiment of the present invention;

FIG. 7 is a sequence diagram for illustrating service provision processing in the wireless communication system according to the first embodiment of the present invention;

FIG. 10 illustrates a notification screen displayed on the wireless communication terminal when there is no available service in the wireless communication system according to the second embodiment of the present invention;

FIG. 11 is a flowchart for illustrating service selection screen generation processing in a wireless communication device of the wireless communication system according to the second embodiment of the present invention;

FIG. 12 is a sequence diagram for illustrating connection setting processing in a wireless communication system according to a third embodiment of the present invention;

FIG. 13 is a sequence diagram for illustrating connection setting processing in a wireless communication system according to a fourth embodiment of the present invention; and FIG. 14 is a sequence diagram for illustrating service provision processing in the wireless communication system according to the fourth embodiment of the present invention.

DESCRIPTION OF THE PREFERRED EMBODIMENTS

Embodiments of the present invention are hereinafter described with reference to the drawings.

First Embodiment

The structure of a wireless communication system 100 according to a first embodiment of the present invention is now described with reference to FIGS. 1 to 7.

Figure 1:
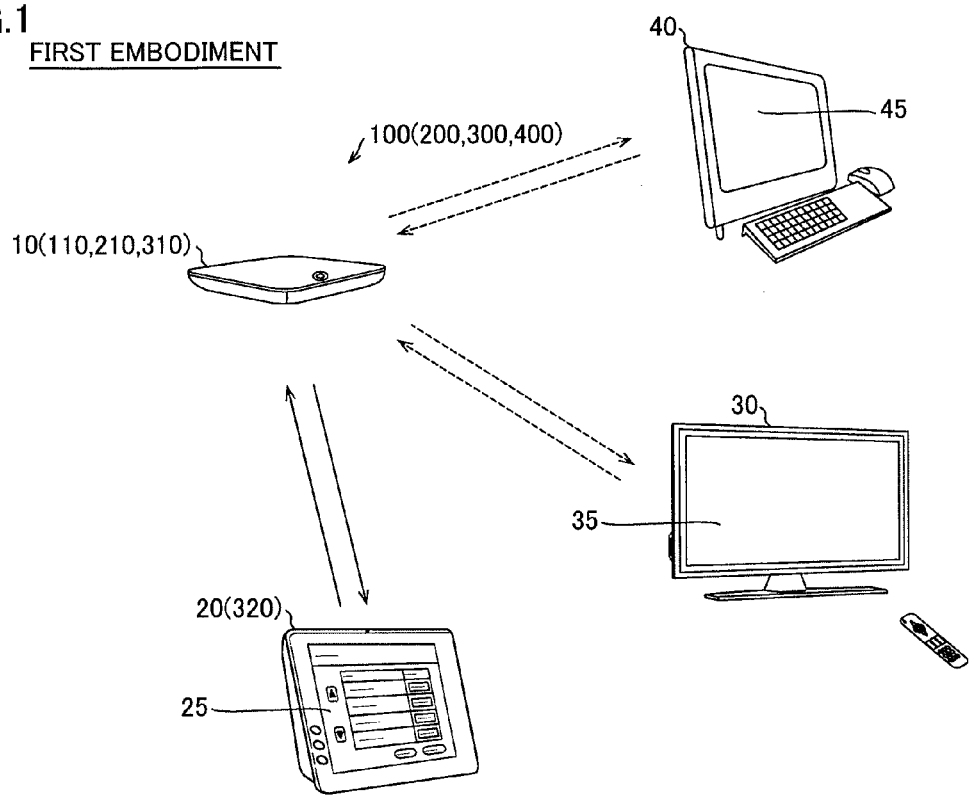
FIG. 1 illustrates the overall structure of a wireless communication system according to a first embodiment of the present invention.

The wireless communication system 100 according to the first embodiment of the present invention includes a wireless communication device 10 as an access point that has a wireless LAN function and a wireless communication terminal 20 as a tablet PC, as shown in FIG. 1. As shown in FIG. 1, in addition to the wireless communication terminal 20, a wireless communication terminal 30 as a television apparatus and a wireless communication terminal 40 as a desktop PC are arranged within the communication range of the wireless communication device 10. The wireless communication terminal 20 is an example of the "specified wireless communication terminal" in the present invention.

The wireless communication device 10 of the wireless communication system 100 determines whether or not a received connection request signal is a connection request signal from the wireless communication terminal 20 having specified identification information when receiving the connection request signal. The wireless communication device 10 of the wireless communication system 100 denies a connection request from the wireless communication terminal 30 or 40 when determining that the received connection request signal is a connection request signal from the wireless communication terminal 30 or 40 other than the wireless communication terminal 20 having the specified identification information at the time of first connection, and makes a connection with the wireless communication terminal 20 when determining that the received connection request signal is the connection request signal from the wireless communication terminal 20 having the specified identification information. In other words, the wireless communication device 10 makes a connection with the wireless communication terminal 20 on the basis of the determination result of whether or not a connection request is from the wireless communication terminal 20 having the specified identification information. The wireless communication device 10 of the wireless communication system 100 detects the wireless communication terminals 30 and 40 arranged within the communication range of the wireless communication device 10 and transmits (provides) connection setting screen information (see FIGS. 3 and 4) to the wireless communication terminal 20 with which the wireless communication device 10 has made a connection to allow the user to provide connection permission/refusal settings between the detected wireless communication terminals 30 and 40 and the wireless communication device 10. The connection setting screen information is an example of the "connection permission/refusal setting information" in the present invention.

In other words, in the wireless communication system 100, the wireless communication device 10 and the wireless communication terminal 20 having the specified identification information, both of which constitute the wireless communication system 100, are only connectable to each other at the time of first connection.

The term, specified identification information, denotes parameters defined by the wireless communication standards in order for the wireless communication device 10 to identify the wireless communication terminal 20. As this specified identification information, a string or the like contained in DEVICE NAME in the WPSIE (Information Element) can be employed when the WPS is employed for connection, for example. The wireless communication device 10 can distinguish the wireless communication terminal 20 from the wireless communication terminals 30 and 40 other than the wireless communication terminal 20 on the basis of the specified identification information. The wireless communication terminal 20 may previously have the specified identification information, or a user may install the specified identification information.

In the wireless communication system 100, the wireless communication terminal 30 permitted to connect and the wireless communication device 10 are connectable to each other when the user provides a connection permission setting of the wireless communication terminal 30 according to a connection setting screen displayed on the wireless communication terminal 20. The wireless communication system 100 establishes a local network (an in-home network, for example) by the wireless communication device 10, the wireless communication terminal 20, and the wireless communication terminal 30 when the wireless communication terminal 30 permitted to connect and the wireless communication device 10 are connected to each other.

In the wireless communication system 100, the wireless communication terminal 40 not permitted to connect and the wireless communication device 10 are not connectable to each other when the user does not provide a connection permission setting (or provides a connection refusal setting) according to the connection setting screen displayed on the wireless communication terminal 20. Therefore, in this wireless communication system 100, only the wireless communication terminal 20 having the specified identification information and the wireless communication terminal 30 permitted to connect are connected to the wireless communication device 10. In the first embodiment, an example of setting a terminal permitted to connect as the wireless communication terminal 30 and setting a terminal not permitted to connect as the wireless communication terminal 40 is described.

In the wireless communication system 100, the wireless communication device 10 can provide a plurality of (five) prescribed services to the wireless communication terminal 20 with which the wireless communication device 10 has made a connection and the wireless communication terminal 30 permitted to connect. In other words, connection of the wireless communication device 10 with the wireless communication terminal 30 in this wireless communication system 100 denotes a state where communication is possible in order for the wireless communication device 10 to provide the prescribed services. The wireless communication system 100 transmits (provides) selection setting screen information to the wireless communication terminal 20 to allow the user to provide a selection setting of prescribed services to be provided, in addition to the connection setting screen information. Thus, the wireless communication terminal 20 acquires the selection setting screen information. The prescribed services include playback services for video content and music content, a file transfer service, a communication service such as internet telephony, a setting change service associated with the wireless communication device 10, etc., for example. The aforementioned connection permission/refusal settings and service selection settings are described later in detail. The selection setting screen information is an example of the "selection setting information" in the present invention.

Each component of the wireless communication device 10 and the wireless communication terminal 20 that constitute the wireless communication system 100 is now described with reference to FIG. 2.

The wireless communication device 10 includes a ROM 11, a RAM 12, an input interface portion 13, a communication portion 14, and a CPU 15. The wireless communication device 10 is provided with no display portion. The ROM 11 is an example of the "storage portion" of the wireless communication device in the present invention. The CPU 15 is an example of the "controller" of the wireless communication device in the present invention.

The ROM 11 is a non-volatile memory including a rewritable flash ROM and stores various programs executed by the CPU 15. More specifically, the ROM 11 stores programs for connection setting processing (see FIG. 6) and service provision processing (see FIG. 7) described later.

The RAM 12 is a volatile memory and is used as a working area when the CPU 15 executes a program loaded from the ROM 11.

The input interface portion 13 is an input operation portion to perform various operations of the wireless communication device 10, such as a power button and a WPS-enabled button.

The communication portion 14 can wirelessly communicate with the wireless communication terminals (20, 30, and 40) within the communication range of the wireless communication device 10. Furthermore, the communication portion 14 is connectable to the Internet by wire or wireless communication.

The CPU 15 can execute various controls associated with the wireless communication device 10.

The wireless communication terminal 20 includes a ROM 21, a RAM 22, an input interface portion 23, a communication portion 24, a display portion 25, and a CPU 26. The CPU 26 is an example of the "controller" of the wireless communication terminal in the present invention.

The ROM 21 is a non-volatile memory including a rewritable flash ROM and stores various programs executed by the CPU 26. The ROM 21 has the specified identification information capable of being identified by the wireless communication device 10.

The RAM 22 is a volatile memory and is used as a working area when the CPU 26 executes a program loaded from the ROM 21.

The input interface portion 23 is an input operation portion to perform various operations of the wireless communication terminal 20, such as a power button, a WPS-enabled button, and a touch panel.

The communication portion 24 can wirelessly communicate with the wireless communication device (10) within the communication range of the wireless communication terminal 20. Furthermore, the communication portion 24 is connectable to the Internet by wire or wireless communication.

The display portion 25 is a liquid crystal display portion and can display screens that correspond to various programs. The display portion 25 can display screens that correspond to various types of screen information when the wireless communication device 10 transmits the various types of screen information.

The CPU 26 can execute various controls associated with the wireless communication terminal 20.

The wireless communication terminals 30 and 40 have structures similar to that of the wireless communication terminal 20 except for that ROMs store no specified identification information capable of being identified by the wireless communication device 10. In other words, the wireless communication terminals 30 and 40 include a display portion 35 and a display portion 45, respectively and further include unshown ROMs, RAMs, input interface portions (a remote controller, a keyboard, etc.; partially shown), communication portions, and CPUs, as shown in FIG. 1.

The connection permission/refusal settings and the service selection settings are now described with reference to FIGS. 3 to 5. Here, an example in which the wireless communication device 10 transmits the connection setting screen information to the wireless communication terminal 20 with which the wireless communication device 10 has made a connection, and thereafter the connection permission setting of the wireless communication terminal 30 and the selection setting of prescribed services to be provided are provided according to the connection setting screen displayed on the display portion 25 of the wireless communication terminal 20 is described.

FIG. 3 shows the connection setting screen in a state where the wireless communication terminals 20, 30, and 40 arranged within the communication range of the wireless communication device 10 have been detected by the wireless communication device 10. In this case, the connection setting screen including a list of the device names of the wireless communication terminals 20, 30, and 40 arranged within the communication range of the wireless communication device 10 and a list of current settings is displayed on the display portion 25 of the wireless communication terminal 20, as shown in FIG. 3. In FIG. 3, only the wireless communication terminal 20 is in a connection permitted state, and the wireless communication terminals 30 and 40 are in a connection refused state.

When the user selects a device name from the list, a display is switched to a specific setting screen (see FIG. 4) of a selected wireless communication terminal. As a selection method of the user, a method such as an instruction through a touch panel as the input interface portion 23 or an operation using a mouse or a remote controller can be usable, for example.

FIG. 4 shows a screen of the connection permission/refusal settings and the service selection settings in the case where the device name of the wireless communication terminal 30 is selected by the user. In this case, a screen of the connection permission/refusal settings and the service selection settings including checkboxes (shown by white circles) of "permit" and "refuse" to provide the connection permission/refusal settings and checkboxes (shown by white squares) of services 1 to 5 to selectively set prescribed services to be provided is displayed on the display portion 25 of the wireless communication terminal 20, as shown in FIG. 4.

After checking a checkbox, the user pushes a "change settings" button on the screen such that changes in the connection permission/refusal settings and the service selection settings are accepted by the wireless communication device 10. In FIG. 4, the wireless communication terminal 30 is set to be permitted to connect, and the services 2, 3, and 5 are set to be provided. When the user pushes a "cancel" button on the screen, the settings are not changed.

When the user pushes the "change settings" button, the display is switched to the connection setting screen shown in FIG. 3. In this case, the connection permission setting of the wireless communication terminal 30 is provided in FIG. 4, and hence the current setting of the wireless communication terminal 30 is switched to a display of "permitted to connect". When the user pushes a "save settings" button on the screen, the aforementioned settings are saved, and a local area network of the wireless communication device 10, the wireless communication terminal 20, and the wireless communication terminal 30 can be established. When the user pushes the "cancel" button on the screen, on the other hand, the settings are not saved.

FIG. 5 shows a service selection screen displayed on the wireless communication terminal 30 in the case where the aforementioned connection permission/refusal settings and service selection settings are provided. In FIG. 4, the services 2, 3, and 5 are set to be provided, and hence the wireless communication terminal 30 displays the service selection screen on which the services 2, 3, and 5 and the exit of the service selection screen are selectable.

The aforementioned connection setting processing is now described specifically on the basis of a sequence diagram with reference to FIG. 6.

First, a user's connection operation is accepted by the wireless communication device 10 at a step S1. Specifically, the user pushes the WPS-enabled button of the input interface portion 13 of the wireless communication device 10 such that the wireless communication device 10 transitions to a connection standby state. At a step S2, a user's connection operation is accepted by the wireless communication terminal 20. In other words, the user pushes the WPS-enabled button of the input interface portion 23 of the wireless communication terminal 20. Consequently, the wireless communication terminal 20 transmits a connection request signal containing the specified identification information to the wireless communication device 10 at a step S3.

At a step S4, the wireless communication device 10 (CPU 15) confirms (determines) whether or not the connection request signal from the wireless communication terminal 20 contains the specified identification information. In this case, the wireless communication terminal 20 has the specified identification information, and hence the wireless communication device 10 transmits a connection response signal to the wireless communication terminal 20 at a step S5. Consequently, connection processing between the wireless communication device 10 and the wireless communication terminal 20 is executed at a step S6.

When confirming (determining) that the connection request signal does not contain the specified identification information (the connection request signal is a connection request signal from the wireless communication terminal 30 or 40) at the step S4, the wireless communication device 10 does not transmit the connection response signal, and hence the connection processing is not executed.

At a step S7, the wireless communication device 10 transmits the connection setting screen information to the wireless communication terminal 20 to allow the user to provide the connection permission/refusal settings. Thus, the wireless communication terminal 20 acquires the connection setting screen information. At a step S8, the connection setting screen is displayed on the display portion 25 of the wireless communication terminal 20. At the step S8, only the wireless communication terminal 20 is displayed in the list of the device names, unlike the connection setting screen shown in FIG. 3.

At a step S9, the wireless communication device 10 broadcasts a device information request signal to each of the wireless communication terminals 20, 30, and 40 to acquire unique information (an MAC address or the like) of each device. At a step S10, each of the wireless communication terminals 20, 30, and 40 transmits a device information response signal containing the unique information of each device to the wireless communication device 10. Thus, the wireless communication device 10 can acquire the unique information of each device, associate the acquired unique information of each device with the connection permission setting or the connection refusal setting, and determine the connection permission/refusal setting for each device.

At a step S11, the wireless communication device 10 transmits the connection setting screen information containing the acquired unique information of each device to the wireless communication terminal 20. At a step S12, the connection setting screen on the display portion 25 of the wireless communication terminal 20 is updated and displayed, as shown in FIG. 3. Thus, the user can provide the connection refusal settings of the wireless communication terminals 30 and 40 through the wireless communication terminal 20 having the specified identification information.

After the user provides the connection permission/refusal settings and the service selection settings, as shown in FIGS. 3 and 4, the wireless communication terminal 20 transmits a connection setting/service selection setting signal containing set information (information about the connection permission/refusal settings and information about the service selection settings) set by the user to the wireless communication device 10 at a step S13. At a step S14, a user's setting operation is accepted by the wireless communication device 10 on the basis of the connection setting/service selection setting signal transmitted from the wireless communication terminal 20. Consequently, the set information containing the information about the connection permission/refusal settings and the information about the service selection settings is acquired by the wireless communication device 10 and is stored in the ROM 11 of the wireless communication device 10. According to the first embodiment, the set information containing the information about the connection permission/refusal settings and the information about the service selection settings is managed by the wireless communication device 10. Thus, the local area network of the wireless communication device 10, the wireless communication terminal 20, and the wireless communication terminal 30 permitted to connect can be established.

The aforementioned service provision processing is now described specifically on the basis of a sequence diagram with reference to FIG. 7. Here, the case where the wireless communication terminal 30 and the wireless communication device 10 are connected to each other after the connection permission/refusal setting and the service selection setting of the wireless communication terminal 30 illustrated in FIGS. 3 and 4 is described.

First, a user's connection operation is accepted by the wireless communication terminal 30 at a step S21. At a step S22, the wireless communication terminal 30 transmits a connection request signal to the wireless communication device 10.

At a step S23, the wireless communication device 10 confirms (determines) whether or not the received connection request signal is a connection request signal from the wireless communication terminal 30 permitted to connect in the connection permission/refusal settings on the basis of the set information containing the information about the connection permission/refusal settings and the information about the service selection settings stored in the ROM 11 of the wireless communication device 10. Specifically, the wireless communication device 10 confirms whether or not the received connection request signal contains the unique information of the wireless communication terminal permitted to connect. In this case, the wireless communication terminal 30 is permitted to connect in the connection permission/refusal settings, and hence the wireless communication device 10 transmits a connection response signal to the wireless communication terminal 30 at a step S24. Consequently, connection processing between the wireless communication device 10 and the wireless communication terminal 30 is executed at a step S25.

When confirming (determining) that the received connection request signal is not the connection request signal from the wireless communication terminal permitted to connect in the connection permission/refusal settings (the received connection request signal is a connection request signal from the wireless communication terminal 40) at the step S23, the wireless communication device 10 does not transmit the connection response signal, and hence the connection processing is not executed.

At a step S26, the wireless communication device 10 transmits service selection screen information to the wireless communication terminal 30 to allow the user to select one from the services 2, 3, and 5 selected on the screen of the service selection settings in FIG. 4 for the wireless communication terminal 30. At a step S27, the service selection screen shown in FIG. 5 is displayed on the display portion 35 (see FIG. 1) of the wireless communication terminal 30 as a television apparatus. The service selection screen information is an example of the "selection information" in the present invention.

At a step S28, a user's service selection operation is accepted by the wireless communication terminal 30. Then, the wireless communication terminal 30 transmits a service start request signal to the wireless communication device 10 at a step S29, and the wireless communication device 10 transmits service information that corresponds to the user's service selection operation to the wireless communication terminal 30 at a step S30. Consequently, prescribed services selected by the user are displayed on the display portion 35 of the wireless communication terminal 30 as a television apparatus at a step S31.

According to the first embodiment, the following effects can be obtained.

According to the first embodiment, as hereinabove described, the wireless communication device 10 (CPU 15) makes a connection with the wireless communication terminal 20 having the specified identification information when determining that the received connection request signal is the connection request signal from the wireless communication terminal 20 having the specified identification information, whereby the wireless communication device 10 can make a connection with only the wireless communication terminal 20 having the specified identification information before the user provides the connection permission/refusal settings. Furthermore, the wireless communication device 10 (CPU 15) provides the connection setting screen information to the wireless communication terminal 20 with which the wireless communication device 10 has made a connection to allow the user to provide the connection permission/refusal settings of the wireless communication terminal 20 with which the wireless communication device 10 has made a connection and the wireless communication terminals 30 and 40. In addition, the wireless communication terminal 20 (CPU 26) acquires the connection setting screen information from the wireless communication device 10 that has made a connection therewith to allow the user to provide the connection permission/refusal settings between the wireless communication device 10 and the other wireless communication terminals 30 and 40 and displays the setting screen of the connection permission/refusal settings between the wireless communication device 10 and the other wireless communication terminals 30 and 40 on the display portion 25 on the basis of the acquired connection setting screen information. Thus, the user can provide the connection permission/refusal settings between the wireless communication terminals 30 and 40 and the wireless communication device 10 through the wireless communication terminal 20 with which the wireless communication device 10 has made a connection. Consequently, the wireless communication device 10 can make a connection with only the wireless communication terminal 20 having the specified identification information and the wireless communication terminal 30 permitted to connect by the user after the user provides the connection permission/refusal settings, and hence connection of the wireless communication device 10 with the wireless communication terminal 40 not intended by the user can be significantly reduced or prevented.

According to the first embodiment, as hereinabove described, the wireless communication device 10 includes no display portion. Furthermore, the wireless communication device 10 (CPU 15) provides the connection setting screen information to the wireless communication terminal 20 with which the wireless communication device 10 has made a connection to allow the user to provide the connection permission/refusal settings such that the wireless communication terminal 20 with which the wireless communication device 10 has made a connection can display the same as an image on the display portion 25. Thus, even in the case of the wireless communication device 10 including no display portion, the connection setting screen (see FIGS. 3 and 4) is displayed on the display portion 25 of the wireless communication terminal 20, whereby the user can easily provide the connection permission/refusal settings of the wireless communication terminals 30 and 40.

According to the first embodiment, as hereinabove described, the wireless communication device 10 can provide the prescribed services. Furthermore, in addition to the setting screen information used when the user provides the connection permission/refusal settings, the wireless communication device 10 (CPU 15) provides the selection setting screen information to the wireless communication terminal 20 with which the wireless communication device 10 has made a connection to allow the user to provide the selection setting of the prescribed services provided to the wireless communication terminal 20 with which the wireless communication device 10 has made a connection and the wireless communication terminal 30 permitted to connect such that the wireless communication terminal 20 can display the same as an image on the display portion 25. In addition, the wireless communication terminal 20 (CPU 26) acquires the selection setting screen information from the wireless communication device 10 to allow the user to provide the selection setting of the prescribed services and displays the setting screen of the selection setting of the prescribed services on the display portion 25 on the basis of the acquired selection setting screen information. Thus, the selection setting screen (see FIG. 4) of the prescribed services is displayed on the display portion 25 of the wireless communication terminal 20 with which the wireless communication device 10 has made a connection, whereby the user can easily select prescribed services to be provided to the wireless communication terminal 20 with which the wireless communication device 10 has made a connection and the wireless communication terminal 30 permitted to connect. After the user provides the selection setting of the prescribed services, the wireless communication device 10 can provide only the prescribed services (the services 2, 3, and 5 in FIG. 4) selectively set, intended to be provided by the user, and hence provision of services (the services 1 and 4 in FIG. 4) not intended by the user can be prevented.

According to the first embodiment, as hereinabove described, the prescribed services include the playback services for video content and music content. Thus, the video content and the music content can be provided to the wireless communication terminal to which the prescribed services are provided as the prescribed services.

According to the first embodiment, as hereinabove described, the prescribed services include the file transfer service and the communication service. Thus, the file transfer service and the communication service can be provided to the wireless communication terminal to which the prescribed services are provided as the prescribed services.

According to the first embodiment, as hereinabove described, the wireless communication device 10 (CPU 15) transmits the prescribed services selectively set on the basis of the selection setting screen information to the wireless communication terminal (the wireless communication terminal 30, for example) to which the prescribed services are provided. Thus, only the prescribed services intended to be provided by the user (selected by the user) can be provided to the wireless communication terminal to which the prescribed services are provided, and hence provision of services not intended by the user to the wireless communication terminal to which the prescribed services are provided can be prevented.

According to the first embodiment, as hereinabove described, the wireless communication device 10 (CPU 15) provides the selection screen information to the wireless communication terminal 30 to which the selection setting of the prescribed services is provided to allow the user to select a prescribed service to be used from the selected prescribed services when the user provides the selection setting of the prescribed services provided to the wireless communication terminal 30 permitted to connect through the wireless communication terminal 20 with which the wireless communication device 10 has made a connection. According to this structure, the selection screen (see FIG. 5) can be displayed on the wireless communication terminal 30 to which the selection setting of the prescribed services is provided, and hence the user can easily select a prescribed service to be used through the displayed selection screen.

According to the first embodiment, as hereinabove described, the wireless communication device 10 (CPU 15) acquires the information about the connection permission/refusal settings set on the basis of the connection setting screen information and determines whether or not the wireless communication terminals 30 and 40 other than the wireless communication terminal 20 are wireless communication terminals permitted to connect on the basis of the acquired information about the connection permission/refusal settings. Thus, the wireless communication device 10 can reliably make a connection with the wireless communication terminal (the wireless communication terminal 30, for example) permitted to connect.

According to the first embodiment, as hereinabove described, the ROM 11 that stores the information about the connection permission/refusal settings is provided in the wireless communication device 10. Thus, the wireless communication device 10 can manage the information about the connection permission/refusal settings set on the basis of the connection setting screen information. Consequently, the wireless communication device 10 can promptly determine whether or not the connection request from the wireless communication terminal 30 or 40 other than the wireless communication terminal 20 is a connection request from the wireless communication terminal permitted to connect, as compared with the case where the wireless communication terminal 20 engages the information about the connection permission/refusal settings.

Second Embodiment

A second embodiment is now described with reference to FIGS. 1, 2, 4, 5, and 8 to 11. In this second embodiment, screen information transmitted from a wireless communication device 110 is varied according to the number of prescribed services available on each of wireless communication terminals 20, 30, and 40 when the wireless communication device 110 provides the prescribed services to the wireless communication terminals 20, 30, and 40, in addition to the structure according to the aforementioned first embodiment.

Figure 2:
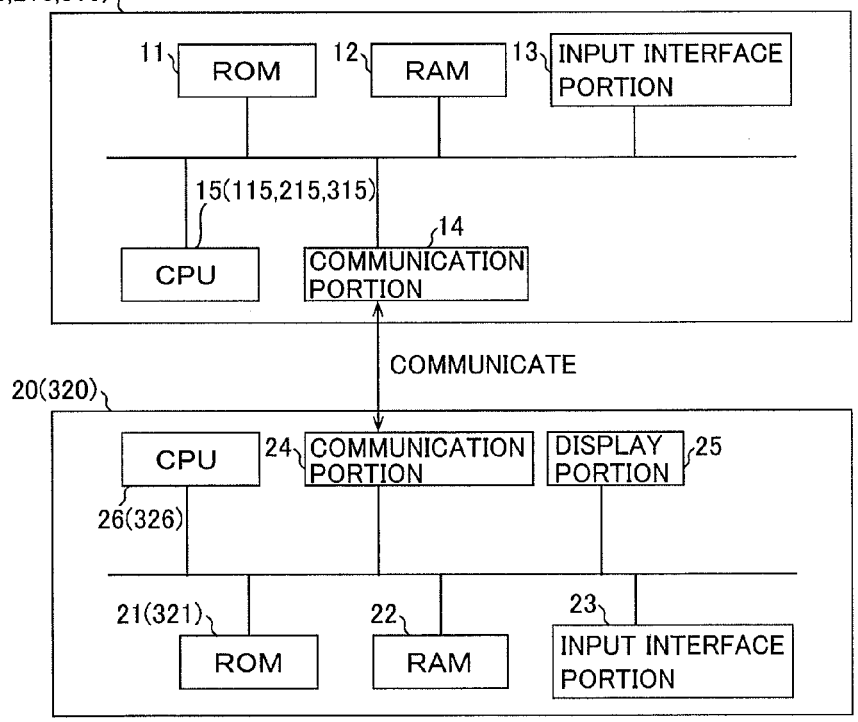
FIG. 2 is a block diagram showing a wireless communication device and a wireless communication terminal of the wireless communication system according to the first embodiment of the present invention.

A wireless communication system 200 includes the wireless communication device 110 including a CPU 115, as shown in FIGS. 1 and 2. Portions of the wireless communication system 200 similar to those of the wireless communication system 100 according to the aforementioned first embodiment shown in FIGS. 1 and 2 are denoted by the same reference numerals, to omit the description. The CPU 115 is an example of the "controller" of the wireless communication device in the present invention.

According to the second embodiment, in the wireless communication system 200, the wireless communication device 110 can provide a plurality of (five) prescribed services to the wireless communication terminal 20 with which the wireless communication device 110 has made a connection and a wireless communication terminal permitted to connect through the wireless communication terminal 20, similarly to the aforementioned first embodiment. In the wireless communication system 200, the screen information transmitted from the wireless communication device 110 is varied according to a prescribed service(s) available on each of the wireless communication terminals 20, 30, and 40 when the wireless communication device 110 provides the prescribed services to each of the wireless communication terminals (the wireless communication terminals 20, 30, and 40).

Specifically, in the wireless communication system 200, the wireless communication device 110 does not provide a prescribed service(s) unavailable on each of the wireless communication terminals to each of the wireless communication terminals when there is the service(s) unavailable on each of the wireless communication terminals in a prescribed service(s) selectively set by a user. More specifically, in the wireless communication system 200, the wireless communication device 110 transmits service selection screen information excluding the service(s) unavailable on each of the wireless communication terminals to each of the wireless communication terminals when there is the service(s) unavailable on each of the wireless communication terminals in the prescribed service(s) selectively set by the user.

In the wireless communication system 200, the wireless communication device 110 directly transmits (provides) a prescribed service available on each of the wireless communication terminals to each of the wireless communication terminals without transmitting the service selection screen information when there is one service available on each of the wireless communication terminals in the prescribed service(s) selectively set by the user.

Furthermore, in the wireless communication system 200, the wireless communication device 110 transmits (provides) notification screen information to each of the wireless communication terminals to notify each of the wireless communication terminals that there is no prescribed service available on each of the wireless communication terminals when there is no service available on each of the wireless communication terminals in the prescribed service(s) selectively set by the user.

A specific screen displayed on each of the wireless communication terminals when the screen information transmitted from the wireless communication device 110 is varied according to the prescribed service(s) available on each of the wireless communication terminals is now described with reference to FIGS. 8 to 10. Here, the case where services 2, 3, and 5 are selectively set as prescribed services provided to the wireless communication terminal 30 is described as an example, as shown in FIGS. 4 and 5.

Figure 8:
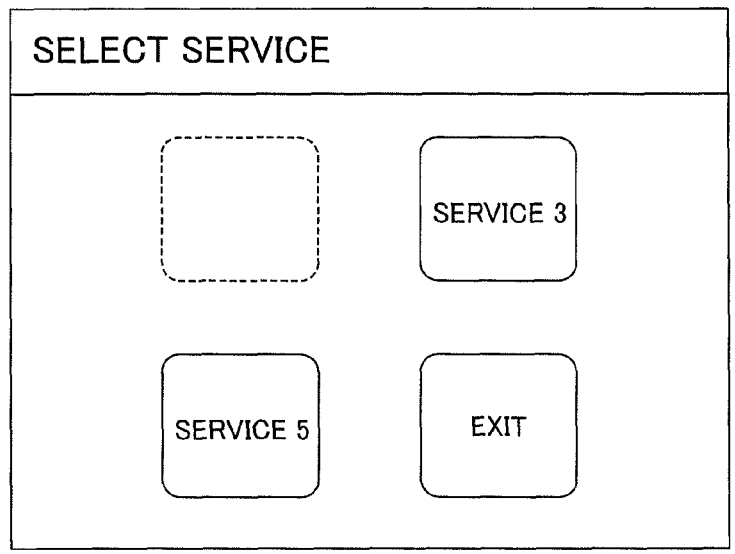
FIG. 8 illustrates a service selection screen displayed on a wireless communication terminal when there is an unavailable service in a wireless communication system according to a second embodiment of the present invention.

FIG. 8 shows a service selection screen in the case where the services 2, 3, and 5 are selectively set as the prescribed services provided to the wireless communication terminal 30, and the service 2 is a prescribed service unavailable on the wireless communication terminal 30. In this case, the service selection screen excluding a selection button for the service 2 is displayed on a display portion 35 (see FIG. 1) of the wireless communication terminal 30, unlike the service selection screen shown in FIG. 5. In FIG. 8, the selection button for the service 2 is virtually shown by a broken line for ease of understanding.

Figure 9:
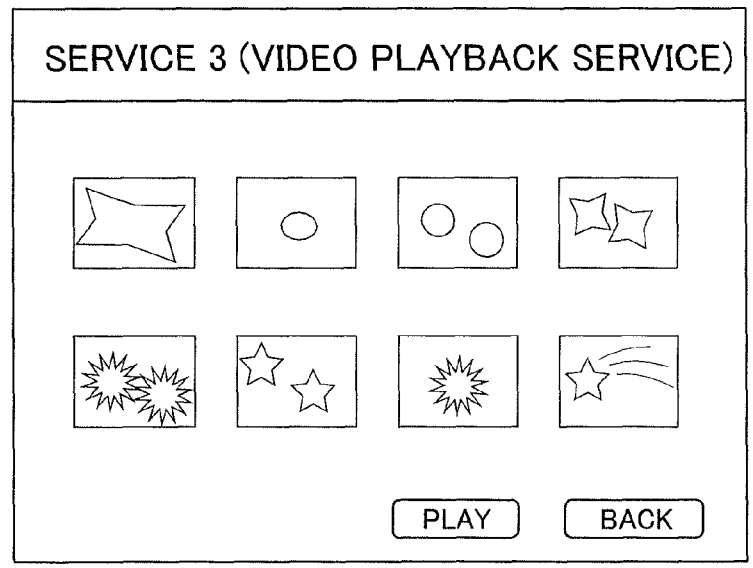
FIG. 9 illustrates a service screen displayed on the wireless communication terminal when there is one available service in the wireless communication system according to the second embodiment of the present invention.

FIG. 9 shows a service selection screen in the case where the services 2, 3, and 5 are selectively set as the prescribed services provided to the wireless communication terminal 30, and only the service 3 is a prescribed service available on the wireless communication terminal 30. In this case, a service screen of the service 3 available on the wireless communication terminal 30 is displayed on the display portion 35 of the wireless communication terminal 30. FIG. 9 shows a video selection screen in the case where the service 3 is a video playback service, and a plurality of thumbnails that correspond to selectable videos are displayed on the display portion 35 of the wireless communication terminal 30. Video content displayed as the thumbnails may be content acquired through the Internet by the wireless communication device 110 or content acquired from the wireless communication terminal with which the wireless communication device 110 has made a connection.

FIG. 10 shows a service selection screen in the case where the services 2, 3, and 5 are selectively set as the prescribed services provided to the wireless communication terminal 30, and there is no prescribed service available on the wireless communication terminal 30. In this case, a notification screen to notify the user that there is no prescribed service available on the wireless communication terminal 30 is displayed on the display portion 35 of the wireless communication terminal 30.

Service selection screen generation processing of the wireless communication device 110 for varying the screen information transmitted from the wireless communication device 110 according to the prescribed service(s) available on each of the wireless communication terminals is now described on the basis of a flowchart with reference to FIG. 11.

First, the wireless communication device 110 (CPU 115) acquires information about the service(s) available on each of the wireless communication terminals (the wireless communication terminals 20, 30, and 40) from each of the wireless communication terminals at a step S41. At a step S42, the wireless communication device 110 determines whether or not there is the service(s) available on each of the wireless communication terminals on the basis of service selection settings provided by the user and the acquired information about the service(s) available on each of the wireless communication terminals. When determining that there is no service available on an arbitrary wireless communication terminal (the case in FIG. 10), the wireless communication device 110 transmits the notification screen information to the arbitrary wireless communication terminal to notify the arbitrary wireless communication terminal that there is no service available on the arbitrary wireless communication terminal at a step S43.

When determining that there is the service(s) available on the arbitrary wireless communication terminal at the step S42, the wireless communication device 110 determines whether or not there is one service available on the arbitrary wireless communication terminal at a step S44. When determining that there are two or more services available on the arbitrary wireless communication terminal, the wireless communication device 110 transmits the service selection screen information excluding the service(s) unavailable on the arbitrary wireless communication terminal to the arbitrary wireless communication terminal at a step S45.

When determining that there is one service available on the arbitrary wireless communication terminal at the step S44, the wireless communication device 110 directly transmits one service available on the arbitrary wireless communication terminal to the arbitrary wireless communication terminal without transmitting the service selection screen information at a step S46.

The remaining structure of the wireless communication system 200 according to the second embodiment is similar to that of the wireless communication system 100 according to the aforementioned first embodiment.

According to the second embodiment, the following effects can be obtained.

According to the second embodiment, as hereinabove described, the wireless communication device 110 (CPU 115) provides connection setting screen information to the wireless communication terminal 20 with which the wireless communication device 110 has made a connection to allow the user to provide connection permission/refusal settings of the wireless communication terminal 20 with which the wireless communication device 110 has made a connection and the wireless communication terminals 30 and 40, whereby connection of the wireless communication device 110 with the wireless communication terminal 40 not intended by the user can be significantly reduced or prevented, similarly to the aforementioned first embodiment.

According to the second embodiment, as hereinabove described, the wireless communication device 110 (CPU 115) does not provide the prescribed service(s) unavailable on the wireless communication terminal 30 to the wireless communication terminal 30 when the user provides the selection setting of the prescribed services provided to the wireless communication terminal 30 permitted to connect through the wireless communication terminal 20 with which the wireless communication device 110 has made a connection, and the provided prescribed services include the prescribed service(s) unavailable on the wireless communication terminal 30 (the case in FIG. 8). Thus, the wireless communication device 110 (CPU 115) does not provide the unnecessary prescribed service(s) (the service 2 in FIG. 8) unavailable on the wireless communication terminal 30, and hence an increase in the volume of wireless communication can be significantly further reduced. When the user uses the prescribed service(s) on the wireless communication terminal 30, the wireless communication device 110 does not provide the prescribed service(s) unavailable on the wireless communication terminal 30, and hence the user's erroneous selection of the prescribed service unavailable on the wireless communication terminal 30 can be prevented. Thus, the convenience can be improved when the user selects the prescribed service.

According to the second embodiment, as hereinabove described, the wireless communication device 110 (CPU 115) directly provides one prescribed service (the service 3 in FIG. 9) available on the wireless communication terminal 30 to the wireless communication terminal 30 without providing the service selection screen information when the user provides the selection setting of the prescribed service(s) provided to the wireless communication terminal 30 permitted to connect through the wireless communication terminal 20 with which the wireless communication device 110 has made a connection, and there is one prescribed service available on the wireless communication terminal 30 in the provided prescribed service(s) (the case in FIG. 9). Thus, selection through the selection screen can be omitted, and hence the user's trouble of selecting the prescribed services can be avoided. Thus, the convenience can be improved when the user uses the prescribed service.

According to the second embodiment, as hereinabove described, the wireless communication device 110 (CPU 115) provides the notification screen information to the wireless communication terminal 30 to notify the wireless communication terminal 30 that there is no prescribed service available on the wireless communication terminal 30 when the user provides the selection setting of the prescribed services provided to the wireless communication terminal 30 permitted to connect through the wireless communication terminal 20 with which the wireless communication device 110 has made a connection, and there is no prescribed service available on the wireless communication terminal 30 (the case in FIG. 10). Thus, the user can easily know that there is no service available on the wireless communication terminal 30 in the prescribed services selectively set.

The remaining effects of the second embodiment are similar to those of the aforementioned first embodiment.

Third Embodiment

A third embodiment is now described with reference to FIGS. 1, 2, and 12. In this third embodiment, a wireless communication device 210 enters a standby state upon completion of the activation, unlike the aforementioned first embodiment in which the wireless communication device 10 enters the standby state by a user's operation of pushing the WPS-enabled button of the wireless communication device 10.

A wireless communication system 300 includes the wireless communication device 210 including a CPU 215, as shown in FIGS. 1 and 2. Portions of the wireless communication system 300 similar to those of the wireless communication systems 100 and 200 according to the aforementioned first and second embodiments shown in FIGS. 1 and 2 are denoted by the same reference numerals, to omit the description. The CPU 215 is an example of the "controller" of the wireless communication device in the present invention.

According to the third embodiment, in the wireless communication system 300, the activation of the wireless communication device 210 is completed by a user's operation of pushing down a power button, and the wireless communication device 210 enters the connection standby state. In other words, according to the third embodiment, the wireless communication device 210 is constantly in a connection acceptable state after the completion of the activation.

Connection setting processing in the wireless communication system 300 according to the third embodiment is now described on the basis of a sequence diagram with reference to FIG. 12. The same processing steps as those in the aforementioned first embodiment shown in FIG. 6 are denoted by the same reference numerals, to omit the description.

At a step S1a, the wireless communication device 210 is activated. Then, a user's connection operation is accepted by a wireless communication terminal 20 at a step S2a. In this case, the user's connection operation may be an operation other than an operation of pushing down a WPS-enabled button. The user's connection operation may be a connection operation through a prescribed application, for example. Subsequent processing steps are the same as those in the aforementioned first embodiment.

The remaining structure of the wireless communication system 300 according to the third embodiment is similar to that of the wireless communication system 100 according to the aforementioned first embodiment.

According to the third embodiment, the following effects can be obtained.

According to the third embodiment, the wireless communication device 210 (CPU 215) provides connection setting screen information to the wireless communication terminal 20 with which the wireless communication device 210 has made a connection to allow the user to provide connection permission/refusal settings of the wireless communication terminal 20 with which the wireless communication device 210 has made a connection and wireless communication terminals 30 and 40, whereby connection of the wireless communication device 210 with the wireless communication terminal 40 not intended by the user can be significantly reduced or prevented, similarly to the aforementioned first embodiment.

According to the third embodiment, as hereinabove described, the activation of the wireless communication device 210 is completed by the user's operation of pushing down the power button, and the wireless communication device 210 enters the connection standby state, whereby it is not necessary to push WPS-enabled buttons of the wireless communication device 210 and the wireless communication terminal 20 around the same time, unlike the case where the wireless communication device 210 enters the standby state by a user's operation of pushing a WPS-enabled button of the wireless communication device 210. Therefore, the user's trouble of making a connection between the wireless communication device 210 and the wireless communication terminal 20 can be reduced.

The remaining effects of the third embodiment are similar to those of the aforementioned first embodiment.

Fourth Embodiment

A fourth embodiment is now described with reference to FIGS. 1, 2, 4, 13, and 14. In this fourth embodiment, a wireless communication terminal 320 manages set information containing information about connection permission/refusal settings and information about service selection settings, unlike the aforementioned first embodiment in which the wireless communication device 10 manages the set information containing the information about the connection permission/refusal settings and the information about the service selection settings.

A wireless communication system 400 includes a wireless communication device 301 including a CPU 315 and the wireless communication terminal 320 including a ROM 321 and a CPU 326, as shown in FIGS. 1 and 2. Portions of the wireless communication system 400 similar to those of the wireless communication system 100 according to the aforementioned first embodiment shown in FIGS. 1 and 2 are denoted by the same reference numerals, to omit the description. The CPU 315 is an example of the "controller" of the wireless communication device in the present invention. The ROM 321 is an example of the "storage portion" of the wireless communication terminal in the present invention. The CPU 326 is an example of the "controller" of the wireless communication terminal in the present invention.

According to the fourth embodiment, the ROM 321 of the wireless communication terminal 320 in the wireless communication system 400 stores the set information containing the information about the connection permission/refusal settings and the information about the service selection settings. Thus, the wireless communication terminal 320 manages the set information containing the information about the connection permission/refusal settings and the information about the service selection settings.

Connection setting processing in the wireless communication system 400 according to the fourth embodiment is now described on the basis of a sequence diagram with reference to FIG. 13. The same processing steps as those in the aforementioned first embodiment shown in FIG. 6 are denoted by the same reference numerals, to omit the description.

First, processing at steps S1 to S11 is performed by a wireless communication device 310, the wireless communication terminal 320, a wireless communication terminal 30, and a wireless communication terminal 40, similarly to the aforementioned first embodiment, as shown in FIG. 13. Then, a connection setting screen is displayed on a display portion 25 of the wireless communication terminal 320 at a step S12. Then, a user provides connection refusal settings of the wireless communication terminals 30 and 40 through the wireless communication terminal 320 having specified identification information. After the user provides the connection permission/refusal settings and the service selection settings shown in FIGS. 3 and 4, according to the fourth embodiment, a user's setting operation is accepted by the wireless communication terminal 320 at a step S51. In other words, the ROM 321 of the wireless communication terminal 320 stores the set information containing the information about the connection permission/refusal settings and the information about the service selection settings. Then, according to the fourth embodiment, the wireless communication terminal 320 manages the set information containing the information about the connection permission/refusal settings and the information about the service selection settings.

Service provision processing in the wireless communication system 400 according to the fourth embodiment is now described on the basis of a sequence diagram with reference to FIG. 14. The same processing steps as those in the aforementioned first embodiment shown in FIG. 7 are denoted by the same reference numerals, to omit the description.

First, processing at steps S21 and S22 is performed by the wireless communication terminal 30, similarly to the aforementioned first embodiment, as shown in FIG. 14.

Then, the wireless communication device 310 transmits a connection setting acquisition request signal to the wireless communication terminal 320 to acquire the set information containing the information about the connection permission/refusal settings and the information about the service selection settings at a step S61. Consequently, the wireless communication terminal 320 transmits a connection setting acquisition response signal containing the set information stored in the ROM 321 of the wireless communication terminal 320 to the wireless communication device 310 at a step S62. Then, according to the fourth embodiment, at a step S23, the wireless communication device 310 confirms whether or not a connection request signal received at the step S22 is a connection request signal from the wireless communication terminal 30 permitted to connect in the connection permission/refusal settings on the basis of the set information acquired at the step S62. Processing at subsequent steps S24 to S31 is the same as that in the aforementioned first embodiment.

The remaining structure of the wireless communication system 400 according to the fourth embodiment is similar to that of the wireless communication system 100 according to the aforementioned first embodiment.

According to the fourth embodiment, the following effects can be obtained.

According to the fourth embodiment, the wireless communication device 310 (CPU 315) provides connection setting screen information to the wireless communication terminal 320 with which the wireless communication device 310 has made a connection to allow the user to provide the connection permission/refusal settings of the wireless communication terminal 320 with which the wireless communication device 310 has made a connection and the wireless communication terminals 30 and 40, whereby connection of the wireless communication device 310 with the wireless communication terminal 40 not intended by the user can be significantly reduced or prevented, similarly to the aforementioned first embodiment.

According to the fourth embodiment, as hereinabove described, the ROM 321 that stores the information about the connection permission/refusal settings set on the basis of the connection setting screen information is provided in the wireless communication terminal 320. Thus, the wireless communication terminal 320 can manage the information about the connection permission/refusal settings set on the basis of the connection setting screen information. Consequently, the memory capacity of the wireless communication device 310 can be conserved as compared with the case where the wireless communication device 310 manages the information about the connection permission/refusal settings.

The remaining effects of the fourth embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the tablet PC (wireless communication terminal 20 or 320), the television apparatus (wireless communication terminal 30), and the desktop PC (wireless communication terminal 40) are employed as the wireless communication terminals that can communicate with the wireless communication device 10 (110, 210, or 310) in each of the aforementioned first to fourth embodiments, the present invention is not restricted to this. According to the present invention, wireless communication terminals such as a printer and a recorder including no display portion may alternatively be employed as the wireless communication terminals that can communicate with the wireless communication device. In this case, the wireless communication device may directly provide a prescribed service(s) available on the wireless communication terminals such as a printer and a recorder including no display portion, of the prescribed services that the wireless communication device can provide without transmitting service selection screen information.

While the wireless communication device 10 (110, 210, or 310) serves as an access point in each of the aforementioned first to fourth embodiments, the present invention is not restricted to this. According to the present invention, a plurality of wireless communication devices may alternatively be provided and be connected to each other by a P2P (peer-to-peer) method, and any of the plurality of wireless communication devices connected to each other may alternatively serve as an access point.

While the wireless communication device 10 (110, 210, or 310) provides the five prescribed services in each of the aforementioned first to fourth embodiments, the present invention is not restricted to this. According to the present invention, the wireless communication device may alternatively provide a plurality of prescribed services other than five or one prescribed service.

While the wireless communication device 10 (110, 210, or 310) makes a connection with the two wireless communication terminals 20 (320) and 30 in each of the aforementioned first to fourth embodiments, the present invention is not restricted to this. According to the present invention, the wireless communication device may alternatively make a connection with a plurality of wireless communication terminals other than two or one wireless communication terminal.

While in the wireless communication system 100, a terminal permitted to connect is the wireless communication terminal 30 and a terminal not permitted to connect is the wireless communication terminal 40 in the aforementioned first embodiment, the present invention is not restricted to this. According to the present invention, a terminal permitted to connect may alternatively be the wireless communication terminal 40, and a terminal not permitted to connect may alternatively be the wireless communication terminal 30. Alternatively, terminals permitted to connect may be the wireless communication terminals 30 and 40, or terminals not permitted to connect may be the wireless communication terminals 30 and 40.

While the wireless communication device 10 does not transmit the connection response signal when the received connection request signal is not the connection request signal from the wireless communication terminal permitted to connect in the connection permission/refusal settings (the received connection request signal is the connection request signal from the wireless communication terminal 40) in the aforementioned first embodiment, the present invention is not restricted to this. According to the present invention, the wireless communication device may alternatively transmit a connection response signal to the wireless communication terminal refused to connect to notify the wireless communication terminal refused to connect of connection refusal.

While the wireless communication device 110 does not provide the prescribed service(s) unavailable on each of the wireless communication terminals (the wireless communication terminals 20, 30, and 40) to each of the wireless communication terminals when there is the service(s) unavailable on each of the wireless communication terminals (the wireless communication terminals 20, 30, and 40) in the prescribed service(s) selectively set by the user in the aforementioned second embodiment, the present invention is not restricted to this. According to the present invention, the wireless communication device may alternatively transmit (provide) selection screen information containing the service(s) unavailable on each of the wireless communication terminals to each of the wireless communication terminals also when there is the service(s) unavailable on each of the wireless communication terminals.

While the wireless communication device 110 transmits (provides) the notification screen information to each of the wireless communication terminals to notify each of the wireless communication terminals that there is no prescribed service available on each of the wireless communication terminals when there is no service available on each of the wireless communication terminals in the prescribed service(s) selectively set by the user in the aforementioned second embodiment, the present invention is not restricted to this. According to the present invention, the wireless communication device may not transmit (provide) the notification screen information to each of the wireless communication terminals when there is no service available on each of the wireless communication terminals.

While the processing operations performed by the wireless communication device 10 (110, 210, or 310) according to the present invention are described, using the flowchart and the sequence diagrams described in a flow-driven manner in which processing is performed in order along a processing flow for the convenience of illustration in each of the aforementioned first to fourth embodiments, the present invention is not restricted to this. According to the present invention, the processing operations performed by the wireless communication device 10 (110, 210, or 310) may alternatively be performed in an event-driven manner in which processing is performed on an event basis. In this case, the processing operations performed by the wireless communication device 10 (110, 210, or 310) may be performed in a complete event-driven manner or in a combination of an event-driven manner and a flow-driven manner.

What is claimed is:

1. A communication device comprising:
a transceiver; and
a controller that determines whether or not a communication terminal from which the transceiver has received a connection request is a specified communication terminal,
the controller that makes a connection with the specified communication terminal based on a determination result of whether or not the communication terminal from which the transceiver has received the connection request is the specified communication terminal and transmits connection permission or refusal setting information including unique information and connection state information of a plurality of communication terminals other than the specified communication terminal to the specified communication terminal with which the controller has made a connection and performs connection permission or refusal setting for any one of the plurality of communication terminals selectively.

2. The communication device according to claim 1, capable of providing a plurality of prescribed services, wherein
the controller further transmits selection setting information to the specified communication terminal to allow the user to provide a selection setting for each of the plurality of the prescribed services to be provided in the plurality of prescribed services.

3. The communication device according to claim 2, wherein
the plurality of the prescribed services includes a playback service for video content or music content.

4. The communication device according to claim 2, wherein
the plurality of the prescribed services includes a file transfer service or a communication service.

5. The communication device according to claim 2, wherein
the controller transmits each of the prescribed services selectively set based on the selection setting information to a communication terminal to which the prescribed services are provided.

6. The communication device according to claim 5, wherein
the controller does not transmit a service unavailable on the communication terminal to which the prescribed services are provided to the communication terminal to which the prescribed services are provided when the prescribed services selectively set based on the selection setting information are the prescribed services unavailable on the communication terminal to which the prescribed services are provided.

7. The communication device according to claim 2, wherein
the controller transmits selection information to a communication terminal to which the prescribed services are provided to allow the user to select a service to be used from the prescribed services selectively set based on the selection setting information.

8. The communication device according to claim 7, wherein
the controller does not transmit the selection information to the communication terminal to which the prescribed services are provided when there is one service available on the communication terminal to which the prescribed services are provided in the prescribed services selectively set based on the selection setting information.

9. The communication device according to claim 2, wherein
the controller notifies a communication terminal to which the prescribed services are provided that there are not the prescribed services available on the communication terminal to which the prescribed services are provided when there is no service available on the communication terminal to which the prescribed services are provided in the prescribed services selectively set based on the selection setting information.

10. The communication device according to claim 1, wherein
the controller acquires information about the connection permission or refusal setting set based on the connection permission or refusal setting information and determines whether or not the communication terminal other than the specified communication terminal is a communication terminal permitted to connect based on the information about the connection permission or refusal setting that has been acquired.

11. The communication device according to claim 10, further comprising a storage that stores the information about the connection permission or refusal setting.

12. A communication terminal comprising:
a transceiver that communicates with a communication device; and
a controller that transmits a connection request containing specified identification information to the communication device through the transceiver and makes a connection with the communication device,
wherein the controller acquires connection permission or refusal setting information including unique information and connection state information of a plurality of other communication terminals from the communication device with which the controller has made a connection to allow the communication device to perform connection permission or refusal setting for any one of the plurality of communication terminals selectively.

13. The communication terminal according to claim 12, further comprising a display, wherein
the controller displays a setting screen of the connection permission or refusal setting between the communication device and another communication terminal on the display based on the connection permission or refusal setting information that has been acquired.

14. The communication terminal according to claim 13, wherein
the controller acquires selection setting information from the communication device to allow the user to provide a selection setting for each of a plurality of prescribed services and displays a setting screen of the selection setting of the prescribed services on the display based on the selection setting information that has been acquired.

15. The communication terminal according to claim 12, further comprising a storage that stores information about the connection permission or refusal setting set based on the connection permission or refusal setting information.

16. A communication method comprising steps of:
determining whether or not a communication terminal from which a transceiver of a communication device has received a connection request is a specified communication terminal by a controller of the communication device; and
making a connection between the controller of the communication device and the specified communication terminal based on a determination result of whether or not the communication terminal from which the transceiver of the communication device has received the connection request is the specified communication terminal and transmitting connection permission or refusal setting information including unique information and connection state information of a plurality of communication terminals other than the specified communication terminal to the specified communication terminal with which the controller has made a connection by the controller of the communication device, and performing connection permission or refusal setting for any one of the plurality of communication terminals selectively.

17. The communication method according to claim 16, further comprising a step of transmitting selection setting information to the specified communication terminal by the controller of the communication device to allow the user to perform a selection setting for each of a plurality of prescribed services to be provided in the plurality of prescribed services.

18. The communication method according to claim 17, further comprising a step of transmitting the prescribed services selectively set based on the selection setting information to a communication terminal to which the prescribed services are provided by the controller of the communication device.

19. The communication method according to claim 18, wherein
the step of transmitting the prescribed service includes a step of not transmitting a service unavailable on the communication terminal to which the prescribed services are provided to the communication terminal to which the prescribed services are provided by the controller of the communication device when the prescribed services selectively set based on the selection setting information is the service unavailable on the communication terminal to which the prescribed services are provided.

20. The communication method according to claim 17, further comprising a step of transmitting selection information to a communication terminal to which the prescribed services are provided by the controller of the communication device to allow the user to select a service to be used from the prescribed services selectively set based on the selection setting information.

* * * * *